(12) United States Patent
Song

(10) Patent No.: US 12,216,470 B2
(45) Date of Patent: Feb. 4, 2025

(54) VEHICLE CONTROL SYSTEM AND VEHICLE DRIVING METHOD USING THE VEHICLE CONTROL SYSTEM

(71) Applicant: HYUNDAI MOBIS Co., Ltd., Seoul (KR)

(72) Inventor: Kyung Jung Song, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 215 days.

(21) Appl. No.: 17/964,941

(22) Filed: Oct. 13, 2022

(65) Prior Publication Data
US 2023/0152807 A1    May 18, 2023

(30) Foreign Application Priority Data

Nov. 16, 2021 (KR) .................. 10-2021-0157992
Nov. 16, 2021 (KR) .................. 10-2021-0157995
Nov. 16, 2021 (KR) .................. 10-2021-0157996

(51) Int. Cl.
| | | |
|---|---|---|
| G05D 1/00 | (2024.01) | |
| B60W 10/20 | (2006.01) | |
| B60W 40/072 | (2012.01) | |
| G06V 20/56 | (2022.01) | |

(52) U.S. Cl.
CPC ......... *G05D 1/0212* (2013.01); *B60W 10/20* (2013.01); *B60W 40/072* (2013.01); *G05D 1/0088* (2013.01); *G06V 20/588* (2022.01); *B60W 2420/403* (2013.01)

(58) Field of Classification Search
CPC ...... G05D 1/0088; G05D 1/02; G05D 1/0212; G06V 20/588; B60W 10/20; B60W 40/072; B60W 2420/403; B60W 60/0051; B60W 60/0053; B60W 60/0055; B60W 2552/30; B60W 2552/53; B60W 2556/25; B60W 2556/35; B60W 2556/40; B60W 2556/50; B60W 30/12
USPC ........................................................ 701/23
See application file for complete search history.

(56) References Cited

U.S. PATENT DOCUMENTS

| | | | |
|---|---|---|---|
| 2007/0069874 A1* | 3/2007 | Huang | B62D 15/029 |
| | | | 340/435 |
| 2018/0257660 A1* | 9/2018 | Ibrahim | G01S 5/0027 |
| 2019/0250000 A1* | 8/2019 | Zhang | G05D 1/021 |
| 2019/0361450 A1* | 11/2019 | Sheckells | B60W 10/20 |
| 2020/0393265 A1* | 12/2020 | Piao | G01C 21/3815 |
| 2021/0001877 A1* | 1/2021 | Han | B60W 40/02 |
| 2021/0109539 A1* | 4/2021 | Kobilarov | B60W 60/0011 |
| 2021/0114617 A1* | 4/2021 | Phillips | G01C 21/3453 |

(Continued)

FOREIGN PATENT DOCUMENTS

| | | | | |
|---|---|---|---|---|
| GB | 2615627 A | * | 8/2023 | ............ B60W 30/12 |

*Primary Examiner* — Atul Trivedi
(74) *Attorney, Agent, or Firm* — MORGAN, LEWIS & BOCKIUS LLP

(57) ABSTRACT

Disclosed are a vehicle control system and a driving method of a vehicle using the vehicle control system. The vehicle control system includes a processor that processes data related to driving of a vehicle, and a vehicle controller that controls the driving of the vehicle. The processor performs an operation of excluding a travel trajectory from data to be clustered and excluding a travel trajectory in updating a sparse map or an operation of adjusting a range of a driving control right of the vehicle, based on the travel trajectory.

20 Claims, 18 Drawing Sheets

(56) References Cited

U.S. PATENT DOCUMENTS

| | | | |
|---|---|---|---|
| 2021/0162994 A1* | 6/2021 | Shalev-Shwartz | G01S 17/931 |
| 2021/0171064 A1* | 6/2021 | Mimura | B60Q 1/545 |
| 2021/0197863 A1* | 7/2021 | Hotta | B60K 35/50 |
| 2021/0302977 A1* | 9/2021 | Saikyo | B60W 50/14 |
| 2022/0063651 A1* | 3/2022 | Dai | B60W 60/001 |
| 2022/0221301 A1* | 7/2022 | Nagappan | B60W 10/18 |
| 2022/0274624 A1* | 9/2022 | Wray | G01C 21/3407 |
| 2022/0306156 A1* | 9/2022 | Wray | G06V 20/588 |
| 2022/0315000 A1* | 10/2022 | Wray | G05D 1/646 |
| 2022/0315037 A1* | 10/2022 | Wankhede | G01S 17/931 |
| 2022/0371580 A1* | 11/2022 | Kusumoto | B60W 10/20 |
| 2022/0371601 A1* | 11/2022 | Kuwahara | B60W 50/14 |
| 2023/0001924 A1* | 1/2023 | Aurand | G01C 21/3658 |
| 2023/0391336 A1* | 12/2023 | Sohn | B60W 30/18159 |
| 2024/0042997 A1* | 2/2024 | Kobayashi | B60W 10/04 |
| 2024/0051529 A1* | 2/2024 | Inoue | B60W 60/001 |
| 2024/0051531 A1* | 2/2024 | Inoue | B60W 30/12 |
| 2024/0051532 A1* | 2/2024 | Inoue | B60W 40/06 |
| 2024/0116532 A1* | 4/2024 | Oh | G06V 20/58 |
| 2024/0135728 A1* | 4/2024 | Ferencz | G01C 21/3407 |

* cited by examiner

----▶ : ROUTE GENERATED BASED ON TARGET TRAJECTORY
----▶ : ROUTE GENERATED AFTER CORRECTING POSITION OF VEHICLE

VEHICLE CONTROL SYSTEM AND VEHICLE DRIVING METHOD USING THE VEHICLE CONTROL SYSTEM

CROSS-REFERENCE TO RELATED APPLICATION

This application claims the benefit of priority to Korean Patent Application No. 10-2021-0157992, filed in the Korean Intellectual Property Office on Nov. 16, 2021, Korean Patent Application No. 10-2021-0157995, filed in the Korean Intellectual Property Office on Nov. 16, 2021, and Korean Patent Application No. 10-2021-0157996, filed in the Korean Intellectual Property Office on Nov. 16, 2021, the entire contents of which are incorporated herein by reference.

TECHNICAL FIELD

The present disclosure relates to a vehicle control system and a vehicle driving method using the vehicle control system, and more particularly, to an autonomous driving technology that improves accuracy of a target travel route.

BACKGROUND

Autonomous driving technology in which a travel route of a vehicle is set and the vehicle travels according to the set travel route while the driver does not drive the vehicle directly is emerging. Autonomous driving technology may be implemented in a scheme of acquiring route information on the travel route, setting the travel route based on the obtained route information, and driving the vehicle according to the set route.

SUMMARY

According to the existing autonomous driving technology, it may not be easy to set an accurate travel route for various situations.

The present disclosure has been made to solve the above-mentioned problems occurring in the prior art while advantages achieved by the prior art are maintained intact.

An aspect of the present disclosure provides a technique for setting an accurate travel route for various situations.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a vehicle control system includes a processor that processes data related to driving of a vehicle, and a vehicle controller that controls the driving of the vehicle, wherein the processor performs an operation of excluding a travel trajectory from data to be clustered and excluding a travel trajectory in updating a sparse map, an operation of adjusting a range of a driving control right of the vehicle, based on the travel trajectory, or a combination of the operations.

According to an aspect of the present disclosure, a vehicle control system includes a processor that processes data related to driving of a vehicle, a sensing device for acquiring data related to the driving of the vehicle from the vehicle and an external environment, and a vehicle controller that controls the driving of the vehicle, wherein the processor identifies whether a recognition level of one of both side lines on a travel route recognized using the sensing device is smaller than or equal to a third threshold value, generates a virtual line based on at least one of the other of the both side lines, a guide line, a curvature of a front road, or a width between both side lines of a previous travel section of the travel route, and controls the vehicle controller to control the driving of the vehicle, based on the generated virtual line.

According to an aspect of the present disclosure, a method for driving a vehicle using a vehicle control system includes performing an operation of excluding a travel trajectory from data to be clustered and excluding a travel trajectory in updating a sparse map, an operation of adjusting a range of a driving control right of the vehicle, based on the travel trajectory, or a combination of the operations.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
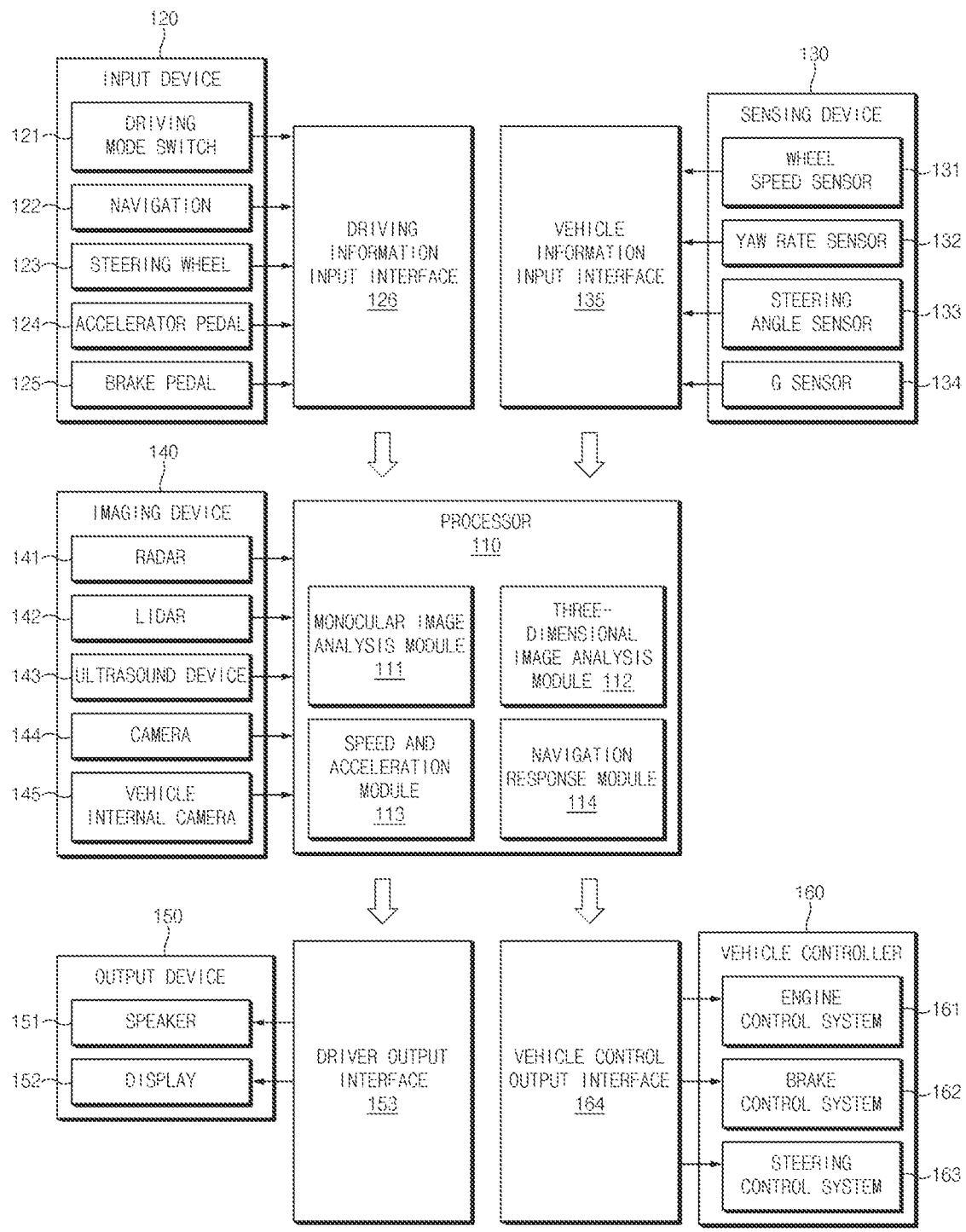
FIG. 1 is a block diagram showing a vehicle control system according to one embodiment of the present disclosure.

FIG. 1 is a block diagram showing a vehicle control system according to one embodiment of the present disclosure.

The vehicle control system according to one embodiment may include a processor 110, an input device 120, a sensing device 130, an imaging device 140, an output device 150, and a vehicle controller 160.

The processor 110 and the vehicle controller 160 of the vehicle control system according to an exemplary embodiment of the present disclosure may be a hardware device implemented by various electronic circuits (e.g., computer, microprocessor, CPU, ASIC, circuitry, logic circuits, etc.). The processor 110 and the vehicle controller 160 may be implemented by a non-transitory memory storing, e.g., a program(s), software instructions reproducing algorithms, etc., which, when executed, performs various functions described hereinafter, and a processor configured to execute the program(s), software instructions reproducing algorithms, etc. Herein, the memory, the processor 110 and the vehicle controller 160 may be implemented as separate semiconductor circuits. Alternatively, the memory, the processor 110 and the vehicle controller 160 may be implemented as a single integrated semiconductor circuit. The processor 110 may embody one or more processor(s). The vehicle controller 160 may embody one or more processor(s).

The processor 110 may realize autonomous driving by processing data related to driving of a vehicle. The processor 110 may include a monocular image analysis module 111, a three-dimensional image analysis module 112, a speed and acceleration module 113, and a navigation response module 114.

The monocular image analysis module 111 may analyze a monocular image of an image set acquired by the imaging device 140. The monocular image analysis module 111 may merge data included in the image set with other types of data acquired by the imaging device 140 to perform monocular image analysis. The monocular image analysis module 111 may detect, within the image set, features such as a lane marking, a vehicle, a pedestrian, a road sign, a highway interchange, a traffic light, a risk object, and other feature related to the vehicle's surroundings. The processor 110 of the vehicle control system may cause at least one navigation response such as rotation, lane change, or acceleration change of the vehicle, based on the analysis result of the monocular image analysis module 111.

The three-dimensional image analysis module 112 may combine data acquired from the imaging device 140 and data acquired from the sensing device 130 with each other and perform analysis thereon. The three-dimensional image analysis module 112 may perform three-dimensional image analysis. The three-dimensional image analysis module 112 may implement a method related to a neural network learning system, a deep neural network learning system, or a non-learning system that utilizes a computer vision algorithm to detect and/or label an object in a context of capturing and processing sensed information. The three-dimensional image analysis module 112 may employ a combination of a learning system and a non-learning system.

The speed and acceleration module 113 may control change in a speed and/or an acceleration of the vehicle. The speed and acceleration module 113 may calculate a target speed of the vehicle based on data obtained from the monocular image analysis module 111 and/or the three-dimensional image analysis module 112. The data obtained from the monocular image analysis module 111 and/or the three-dimensional image analysis module 112 may include a target position, a speed, an acceleration, the vehicle's position and/or speed with respect to a surrounding vehicle, a pedestrian or an object on a road, and position information of the vehicle for lane indication of the road. The speed and acceleration module 113 may transmit a speed control signal to the vehicle controller 160 based on the calculated target speed.

The navigation response module 114 may determine a necessary navigation response based on the data obtained from the monocular image analysis module 111, the three-dimensional image analysis module 112, and the input device 120. The data obtained from the monocular image analysis module 111, the three-dimensional image analysis module 112, and the input device 120 may include a position and a speed of the vehicle with respect to a surrounding vehicle, a pedestrian, and an object on a road, and target position information of the vehicle. The navigation response may be determined based on map data, preset vehicle position, a relative speed or a relative acceleration between the vehicle and at least one object. The navigation response module 114 may transmit a navigation control signal to the vehicle controller 160 based on a navigation response determined as being necessary. For example, the navigation response module 114 may generate the necessary navigation response by rotating the vehicle's steering handle to induce rotation by a preset angle. The navigation response determined to be necessary by the navigation response module 114 may be used as data input to the speed and acceleration module 113 to calculate a speed change of the vehicle.

The input device 120 may receive a user input for controlling a driving function. The input device 120 may include a driving mode switch 121, a navigation 122, a steering wheel 123, an accelerator pedal 124, and a brake pedal 125. The input device 120 may transmit the user input to the processor 110 through a driving information input interface 126.

The sensing device 130 may acquire data related to driving of the vehicle from the vehicle and an external environment. The sensing device 130 may include a wheel speed sensor 131, a yaw rate sensor 132, a steering angle sensor 144, and a G sensor 134. The sensing device 130 may transmit the acquired data to the processor 110 through a vehicle information input interface 135.

The imaging device 140 may detect and image an external environment. The imaging device 140 may include a radar 141, a lidar 142, an ultrasound device 143, a camera 144, and a vehicle internal camera 145. The imaging device 140 may transmit the sensed and imaged external environment to the processor 110.

The output device 150 may provide information related to driving of the vehicle to an occupant including the driver. The output device 150 may include a speaker 151 and a display 152. The output device 150 may provide information related to driving of the vehicle output from the processor 110 through a driver output interface 153 to the occupant.

The vehicle controller 160 may control driving of the vehicle. The vehicle controller 160 may include an engine control system 161, a brake control system 162, and a steering control system 163. The vehicle controller 160 may receive driving control information output from the processor 110 through a vehicle control output interface 164 to control driving of the vehicle.

Figure 2:
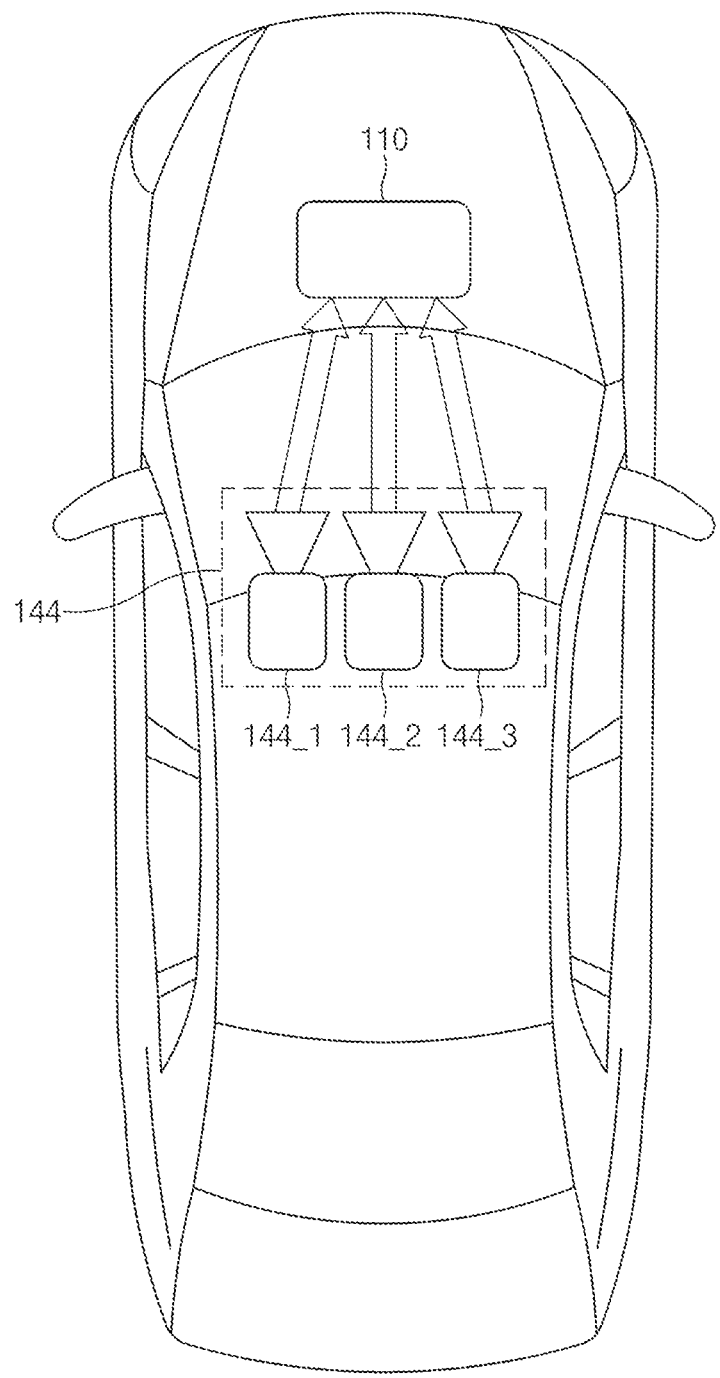
FIG. 2 is a view showing a position at which a camera of a vehicle control system according to one embodiment of the present disclosure is disposed on a vehicle.

FIG. 2 is a view showing the position in which a camera of the vehicle control system according to one embodiment of the present disclosure is disposed on the vehicle.

A camera 144 may include a first camera device 144_1, a second camera device 144_2, and a third camera device 144_3. The first camera device 144_1, the second camera device 144_2, and the third camera device 144_3 may be arranged side by side in a width direction of the vehicle. The first camera device 144_1, the second camera device 144_2, and the third camera device 144_3 may be disposed around a rear view mirror of the vehicle and/or adjacent to a driver seat. At least portions of field of views (FOV) of the first camera device 144_1, the second camera device 144_2, and the third camera device 144_3 may overlap each other.

The camera 144 may image an external environment. The camera 144 may fuse image information imaged by the first camera device 144_1, the second camera device 144_2, and the third camera device 144_3 with each other. The camera 144 may acquire a three-dimensional image using differences between field of views (FOV) thereof based on differences between positions of the first camera device 144_1, the second camera device 144_2, and the third camera device 144_3. The camera 144 may transmit image data of the external environment as captured to the processor 110.

Figure 3:
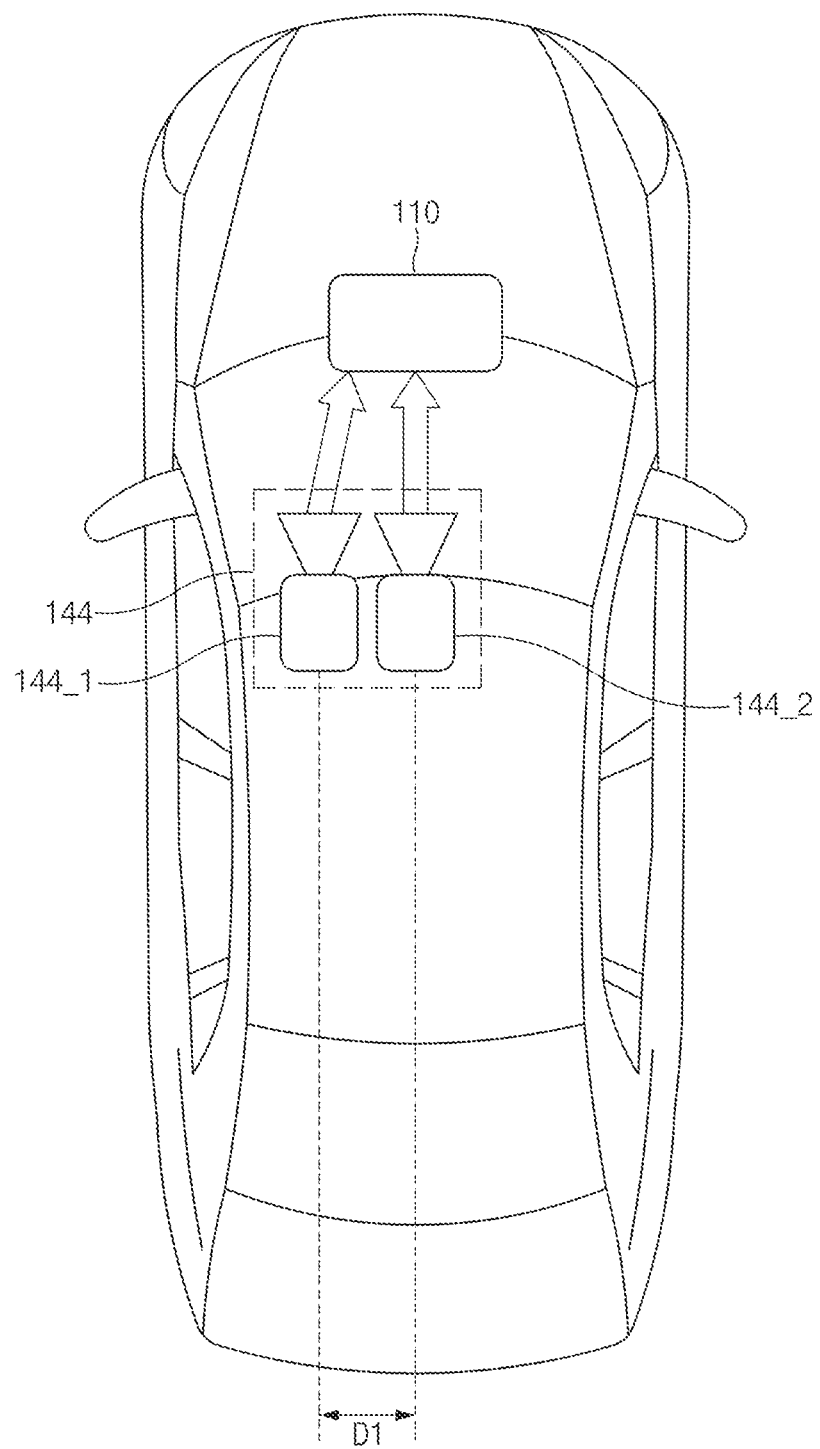
FIG. 3 is a view showing a position at which a camera of a vehicle control system according to one embodiment of the present disclosure is disposed on a vehicle.

FIG. 3 is a view showing a position in which a camera of the vehicle control system according to one embodiment of the present disclosure is disposed on the vehicle.

The camera 144 may include the first camera device 144_1 and the second camera device 144_2. The first camera device 144_1 and the second camera device 144_2 may be arranged side by side in the width direction of the vehicle. The first camera device 144_1 and the second camera device 144_2 may be arranged around the rear view mirror of the vehicle and/or adjacent to the driver seat. At least portions of field of views (FOV) of the first camera device 144_1 and the second camera device 144_2 may overlap each other. The first camera device 144_1 and the second camera device 144_2 may be spaced apart from each other by a first distance D1 in the width direction of the vehicle.

The camera 144 may image an external environment. The camera 144 may fuse image information imaged by the first camera device 144_1 and the second camera device 144_2 with each other. The camera 144 may acquire a three-dimensional image using a difference between the field of views (FOV) thereof based on a difference between positions of the first camera device 144_1 and the second camera device 144_2. The camera 144 may transmit the image data of the external environment as captured to the processor 110.

Figure 4:
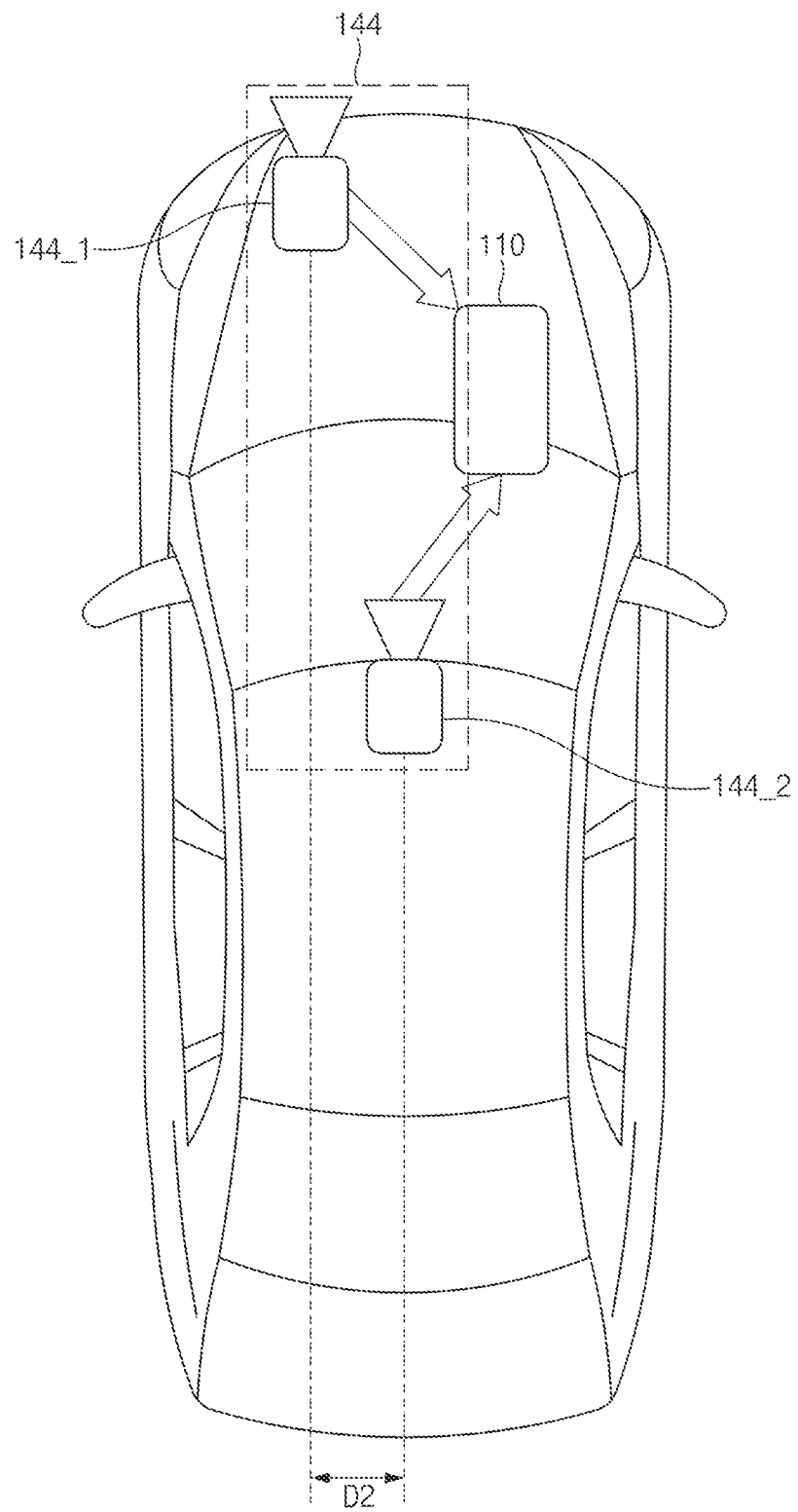
FIG. 4 is a view showing a position at which a camera of a vehicle control system according to one embodiment of the present disclosure is disposed on a vehicle.

FIG. 4 is a view showing a position in which a camera of the vehicle control system according to one embodiment of the present disclosure is disposed on the vehicle.

The camera 144 may include the first camera device 144_1, the second camera device 144_2, and the third camera device 144_3. The first camera device 144_1 may be disposed above a bumper area of the vehicle or inside the bumper area. The first camera device 144_1 may be disposed adjacent to any one of corners of the bumper area. The second camera device 144_2 may be disposed around the rear view mirror of the vehicle and/or adjacent to the driver seat. At least portions of field of views (FOV) of the first camera device 144_1 and the second camera device 144_2 may overlap each other. The first camera device 144_1 and the second camera device 144_2 may be spaced apart from each other by a second distance D2 in the width direction of the vehicle.

The camera 144 may image an external environment. The camera 144 may fuse image information imaged by the first camera device 144_1 and the second camera device 144_2 with each other. The camera 144 may acquire a three-dimensional image using a difference between the field of views (FOV) thereof based on a difference between positions of the first camera device 144_1 and the second camera device 144_2. The camera 144 may transmit the image data of the external environment as captured to the processor 110.

Figure 5:
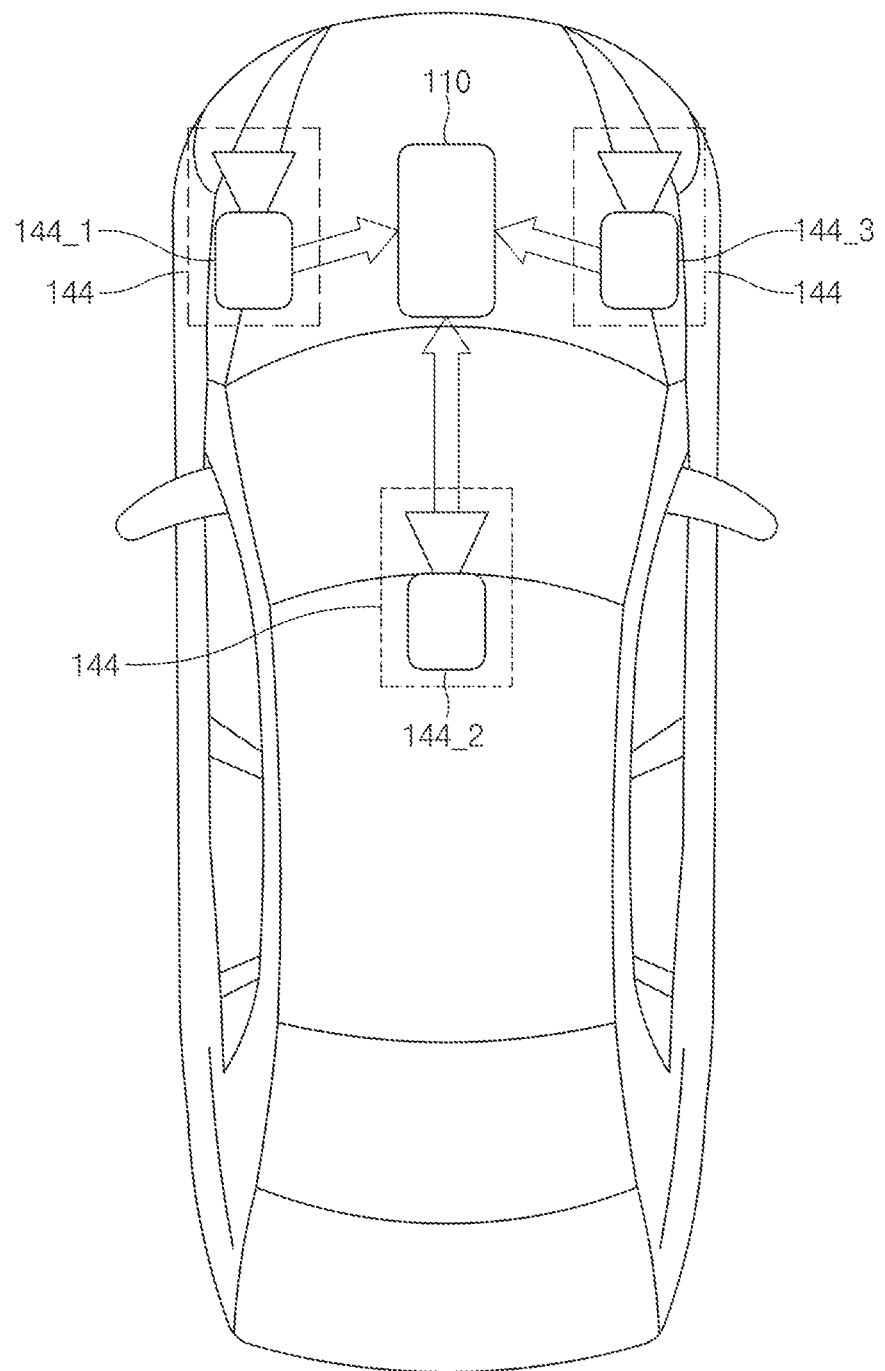
FIG. 5 is a view showing a position in which a camera of a vehicle control system according to one embodiment of the present disclosure is disposed on a vehicle.

FIG. 5 is a view showing a position in which a camera of the vehicle control system according to one embodiment of the present disclosure is disposed on the vehicle.

The camera 144 may include the first camera device 144_1, the second camera device 144_2, and the third camera device 144_3. The first camera device 144_1 and the third camera device 144_3 may be disposed above or inside the bumper area of the vehicle. The first camera device 144_1 may be disposed adjacent to any one of the corners of the bumper area. The third camera device 144_3 may be disposed adjacent to a corner of the bumper area except for the corner where the first camera device 144_1 is disposed. The second camera device 144_2 may be disposed around the rear view mirror of the vehicle and/or adjacent to the driver seat. At least portions of field of views (FOV) of the first camera device 144_1, the second camera device 144_2, and the third camera device 144_3 may overlap each other.

The camera 144 may image an external environment. The camera 144 may fuse image information imaged by the first camera device 144_1, the second camera device 144_2, and the third camera device 144_3 with each other. The camera 144 may acquire a three-dimensional image using differences between field of views (FOV) based on differences between positions of the first camera device 144_1, the second camera device 144_2, and the third camera device 144_3. The camera 144 may transmit the image data of the external environment as captured to the processor 110.

Figure 6:
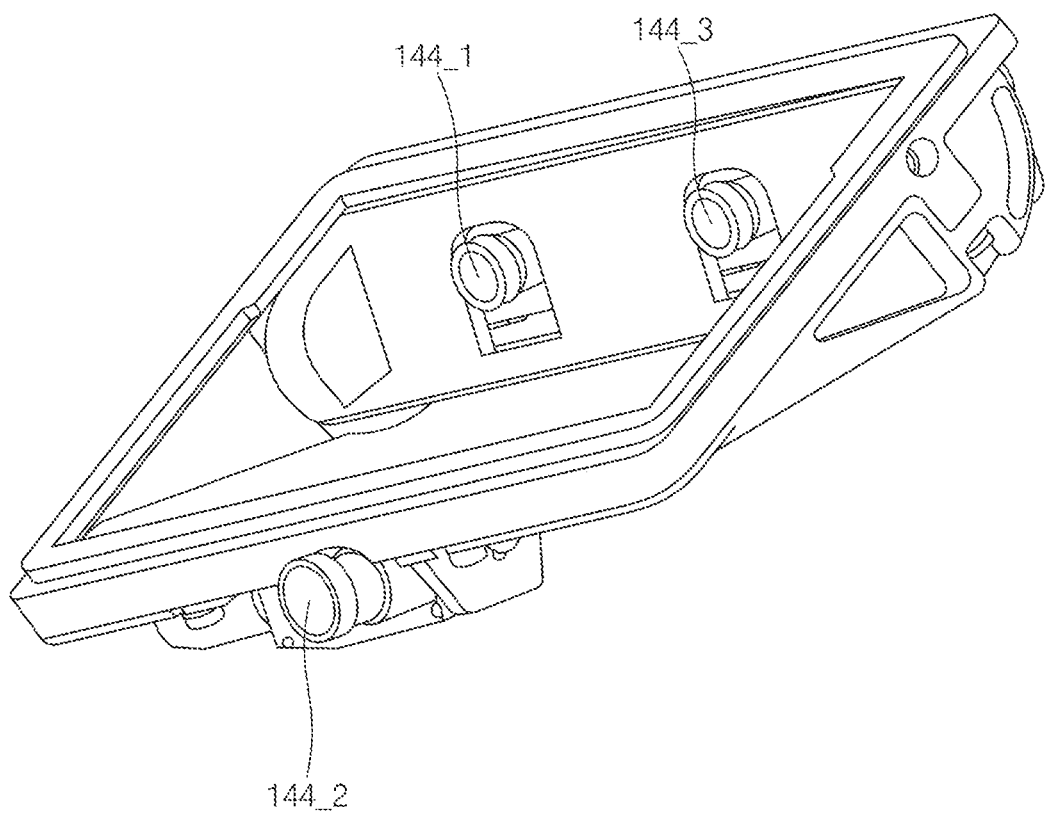
FIG. 6 is a view showing a plurality of camera devices of a vehicle control system according to one embodiment of the present disclosure.

FIG. 6 is a view showing a plurality of camera devices of the vehicle control system according to one embodiment of the present disclosure.

Figure 7:
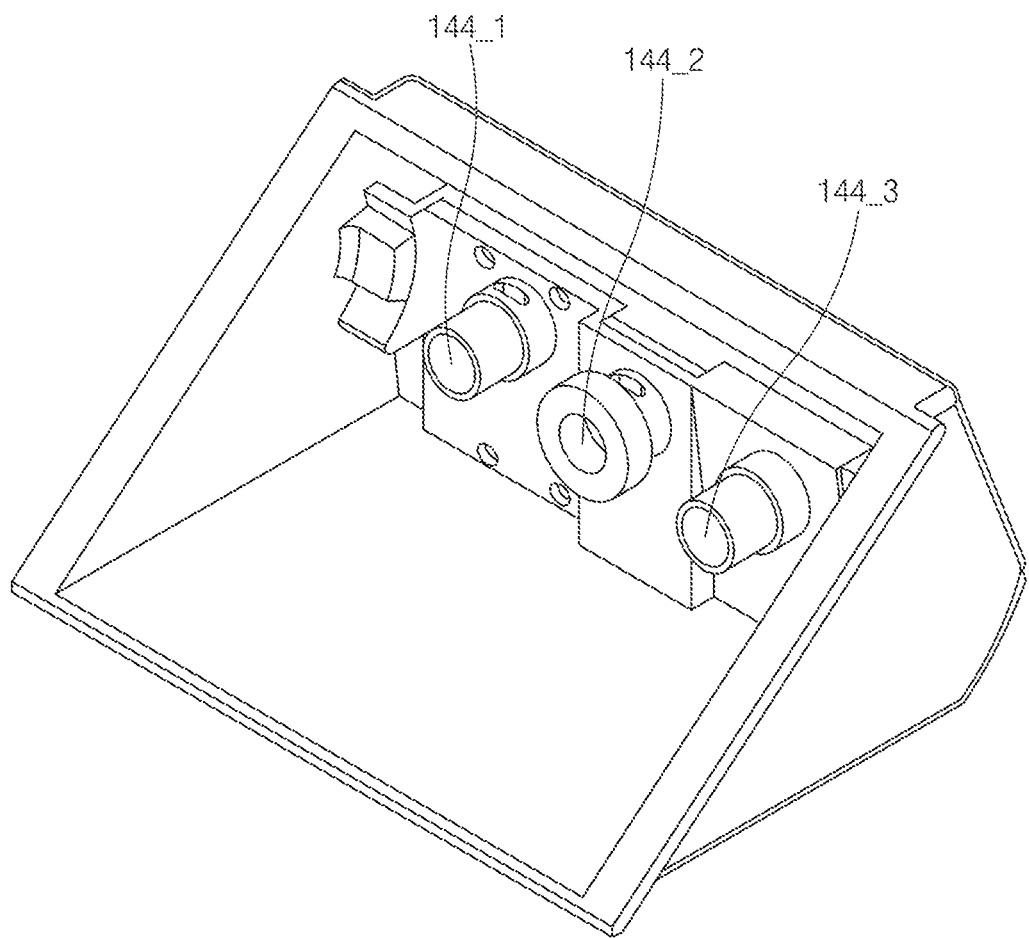
FIG. 7 is a view showing a plurality of camera devices of a vehicle control system according to one embodiment of the present disclosure.

The plurality of camera devices may include the first camera device 144_1, the second camera device 144_2, and the third camera device 144_3. FIG. 7 is a view showing a plurality of camera devices of a vehicle control system according to one embodiment of the present disclosure. The plurality of camera devices may include the first camera device 144_1, the second camera device 144_2, and the third camera device 144_3.

Each of the first camera device 144_1, the second camera device 144_2, and the third camera device 144_3 may include an image capture device of an appropriate type. The image capture device may include an optical axis. The image capture device may include an Aptina M9V024 WVGA sensor of a global shutter scheme. The image capture device may provide a resolution of 1280×560 pixels and may include a rolling shutter scheme. The image capture device may include a variety of optical elements. The image capture device may include at least one lens to provide a focal length and a field of view (FOV) required by the image capture device. The image capture device may be combined with a 6 mm lens or a 12 mm lens.

Each of the first camera device 144_1, the second camera device 144_2, and the third camera device 144_3 may have a designated field of view (FOV) angular range. Each of the first camera device 144_1, the second camera device 144_2, and the third camera device 144_3 may have a general field of view (FOV) angular range of 40 degrees or greater and 56 degrees or smaller. Each of the first camera device 144_1, the second camera device 144_2, and the third camera device 144_3 may have a narrow field of view (FOV) angular range of 23 degrees or greater and 40 degrees or smaller. Each of the first camera device 144_1, the second camera device 144_2, and the third camera device 144_3 may have a wide FOV (field of view) angular range of 100 degrees or greater and 180 degrees or smaller. Each of the first camera device 144_1, the second camera device 144_2, and the third camera device 144_3 may include a wide-angle bumper camera or a camera capable of securing up to a 180-degree field of view (FOV). The field of view (FOV) of the first camera device 144_1 may be wider, narrower, or partially overlapping than the field of view (FOV) of the second camera device 144_2.

A 7.2 megapixel image capture device with an aspect ratio of about 2:1 (e.g., H×V=3800×1900 pixels) and a horizontal field of view (FOV) of about 100 degrees may replace a configuration of a plurality of camera device composed of the first camera device 144_1, the second camera device 144_2, and the third camera device 144_3. A vertical field of view (FOV) of a megapixel image capture device using a radially symmetrical lens may be realized to be 50 degrees or smaller due to lens distortion. A radially asymmetric lens may be used to achieve a vertical field of view (FOV) of 50 degrees or greater for a horizontal field of view (FOV) of 100 degrees.

A driving support function may be provided using a multi-camera system including a plurality of camera devices. The multi-camera system may use at least one camera facing in a front direction of the vehicle. In the multi-camera system, at least one camera may face in a side direction or a rear direction of the vehicle. The multi-camera system may be configured so that the first camera device 144_1 and the second camera device 144_2 face in the front direction and/or the side direction of the vehicle using a dual-camera imaging system.

The multi-camera systems including the plurality of camera devices may employ a triple camera imaging system in which FOVs (field of view) of the first camera device 144_1, the second camera device 144_2, and the third camera device 144_3 are different from each other. The triple-camera imaging system may perform determinations based on information obtained from objects positioned at various distances in the front and side directions of the vehicle.

The first camera device 144_1 may be connected to a first image processor to perform monocular image analysis of an image provided by the first camera device 144_1. The second camera device 144_2 may be connected to a second image processor to perform monocular image analysis of an image provided by the second camera device 144_2. Information processed and output by the first and the second image processors may be combined with each other. The second image processor may receive images from both the first camera device 144_1 and the second camera device 144_2 and perform three-dimensional analysis thereon. Monocular image analysis may mean image analysis performed based on an image captured from a single field of view (e.g., an image captured by a single camera). The three-dimensional image analysis may mean image analysis performed based on two or more images captured with at least one image capture parameter (e.g., images captured respectively by at least two cameras). Captured images suitable for three-dimensional image analysis may include images captured from at least two positions, images captured from different fields of views (FOV), images captured using different focal lengths, and images captured based on parallax information.

Figure 8:
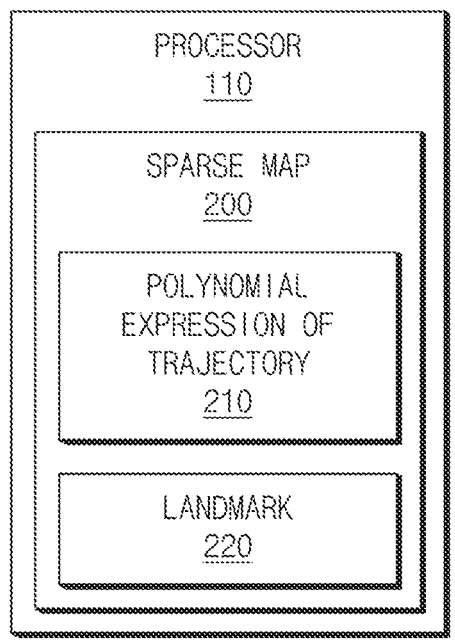
FIG. 8 is a block diagram showing a sparse map of a processor according to one embodiment of the present disclosure.

FIG. 8 is a block diagram showing a sparse map of a processor according to one embodiment of the present disclosure.

The processor 110 may include a sparse map 200. The sparse map 200 may be used for autonomous driving. The sparse map 200 may provide information for navigation of autonomous driving vehicles. The sparse map 200 and the data processed by the sparse map 200 may be stored in a memory of the vehicle control system or may be transmitted/received to/from a remote server. The sparse map 200 may store therein and use a polynomial expression of at least one trajectory along which the vehicle travels on a road. In the sparse map 200, a feature of a road section may be simplified and may be recognized as an object. The sparse map 200 may reduce an amount of data stored and transmitted/received for autonomous driving vehicle navigation. The sparse map 200 may include a polynomial expression 210 of a trajectory and a landmark 220.

The polynomial expression 210 of the trajectory may be a polynomial expression of a target trajectory for guiding autonomous driving along a road section. The target trajectory may represent an ideal route for a vehicle to travel in a road section. The road section may be expressed with at least one target trajectory. The number of target trajectories may be smaller than the number of a plurality of lines included in the road section. A vehicle operating on a road may determine navigation in consideration of a line corresponding to the target trajectory and a line offset using one of the target trajectories.

The landmark 220 may be a place or a mark associated with a specific road section or a local map. The landmark 220 may be identified and stored in the sparse map 200. A spacing between landmarks 220 may be adjusted. The landmark 220 may be used for autonomous driving navigation. The landmark 220 may be used to determine the vehicle's current position with respect to the stored target trajectory. An autonomous driving vehicle may adjust a travel direction at a current position so as to coincide with a direction of the target trajectory using the vehicle's current position information.

The landmark 220 may be used as a reference point for determining a position of the vehicle with respect to the target trajectory. While the vehicle drives based on dead reckoning in which the vehicle determine its itself-movement and estimates its position with respect to the target trajectory, the vehicle may eliminate an error in a position determination due to the dead reckoning, using a position of the landmark 220 that appears in the sparse map 200. The landmark 220 identified in the sparse map 200 may act as an anchor to allow the vehicle to accurately determine the vehicle's position with respect to the target trajectory.

Figure 9:
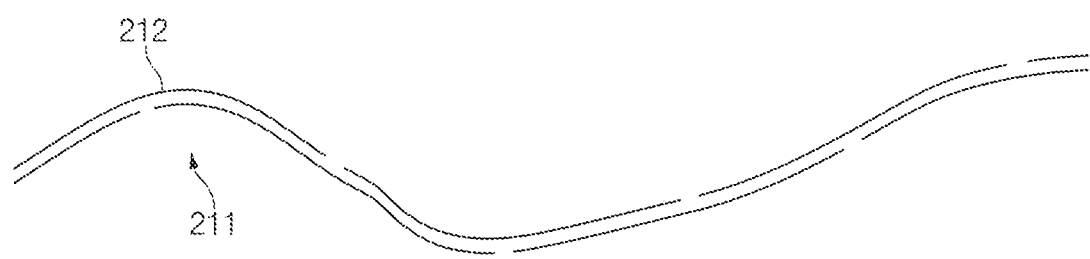
FIG. 9 is a diagram showing a polynomial expression of a trajectory according to one embodiment of the present disclosure.

FIG. 9 is a diagram showing the polynomial expression of the trajectory according to one embodiment of the present disclosure.

The sparse map may include information about a feature of a road. The sparse map may store therein a curved shape in sections 212 included in a road 211. Each of the sections 212 may have a curved shape that may be expressed as a polynomial. The road 211 may be modeled as a three-dimensional polynomial expression as a combination of the curved shapes of the lines, each line including left and right sides. A plurality of polynomials may be used to express a position and a shape of the road 211 and each of the sections 212 included in the road 211. A polynomial expressing each of the sections 212 may define a position and a shape of the section 212 within a specified distance.

Figure 10:
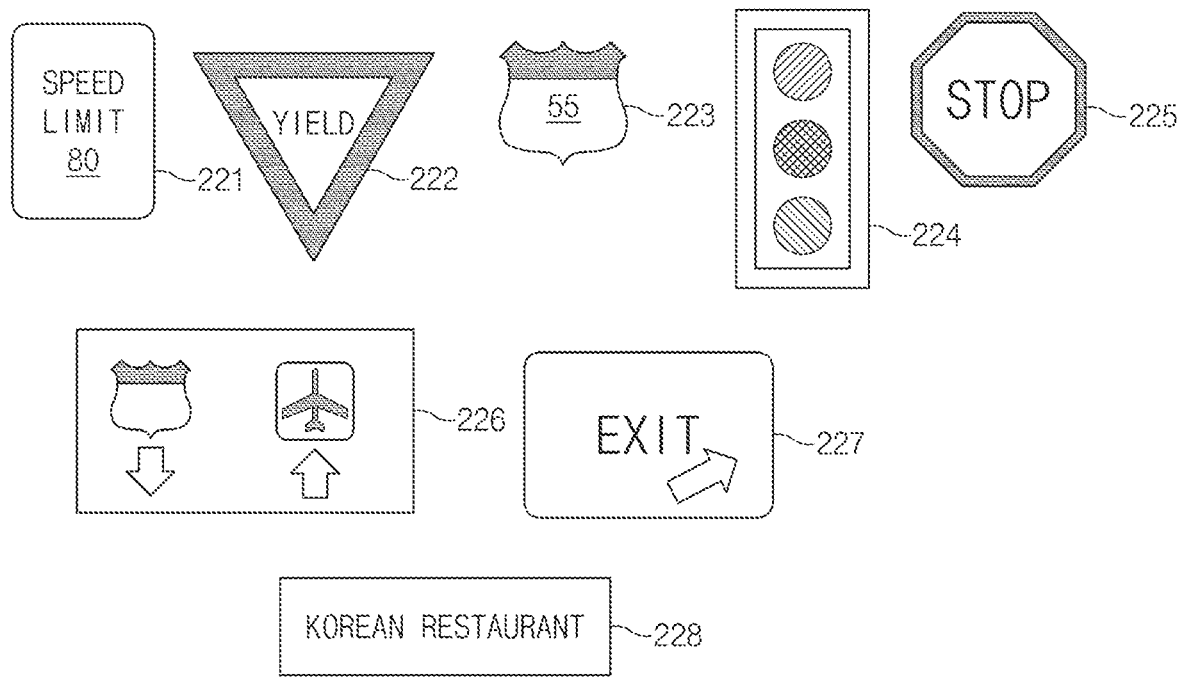
FIG. 10 is a diagram showing a landmark according to one embodiment of the present disclosure.

FIG. 10 is a diagram showing a landmark according to one embodiment of the present disclosure.

The landmarks may include a traffic sign plate, a direction indication sign plate, roadside facilities, and a general sign plate. The traffic sign plate may be a sign plate that guides traffic conditions and regulations to be observed during driving. The traffic sign plate may include a speed limit sign plate 221, a yield sign plate 222, a road number sign plate 223, a traffic signal sign plate 224, and a stop sign plate 225. The direction indication sign plate may be a sign plate with at least one arrow indicating at least one direction to another location. The direction indication sign plate may include a highway sign plate 226 with an arrow guiding the vehicle to another road or location and an exit sign plate 227 with an arrow guiding the vehicle out of the road. The general sign plate may be a sign plate that provides information related to a place. The general sign plate may include a signboard 228 of a famous restaurant in an area.

The sparse map may include a plurality of landmarks related to the road section. A simplified image of an actual image of each landmark may be stored in the sparse map. The simplified image may be composed of data depicting a feature of the landmark. The image stored in the sparse map may be expressed and recognized using a smaller amount of data than an amount of data required by the actual image. Data representing the landmark may include information to depicting or identify the landmark formed along the road.

Figure 11:
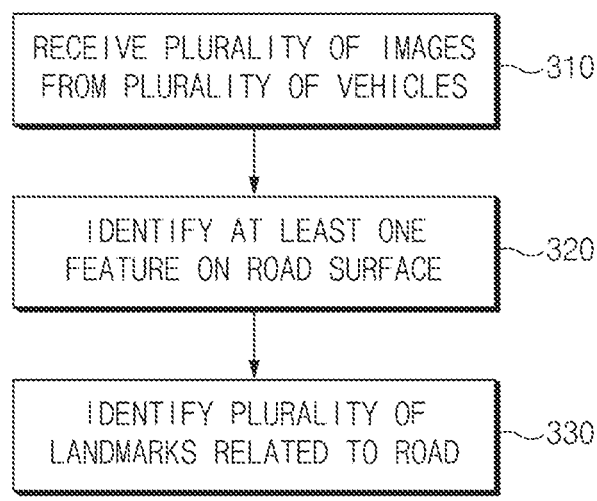
FIG. 11 is a flowchart showing a method in which a vehicle control system according to one embodiment of the present disclosure generates a sparse map.

FIG. 11 is a flowchart showing a method of generating a sparse map according to one embodiment of the present disclosure.

The vehicle control system may receive a plurality of images from a plurality of vehicles in operation 310. Each of the plurality of cameras disposed on the vehicle may image a vehicle surrounding situation which the vehicle faces while driving along the road section and thus may capture a plurality of images showing the vehicle surrounding situation. The plurality of images showing the vehicle surrounding situation may show a shape and a situation of the vehicle's travel route. The vehicle control system may receive the plurality of images captured by the plurality of cameras.

The vehicle control system may identify at least one feature on a road surface in operation 320. The vehicle control system may simplify a feature of the road surface running along the road section as a representation of at least one line, based on the plurality of images. The simplified line representation of the feature of the road surface may represent a route along the road section substantially corresponding to the road surface feature. The vehicle control system may analyze the plurality of images received from the plurality of cameras to identify an edge or a lane mark of a road. The vehicle control system may determine a travel trajectory following a road section associated with the edge of the road or the lane mark thereof. A trajectory or line representation may include a spline, a polynomial expression, or a curve. The vehicle control system may determine the vehicle's travel trajectory based on the camera's itself-movement, such as 3D translation and/or 3D rotational movement.

The vehicle control system may identify a plurality of landmarks related to the road in operation 330. The vehicle control system may analyze the plurality of images received from the camera to identify at least one landmark on the road section. The landmarks may include the traffic sign plate, the direction indication sign plate, the roadside facilities, and the general sign plate. The analysis may include a rule for admitting and rejecting a determination that the landmark may be a landmark related to a road section. The analysis may include a rule in which when a ratio of images in which the landmark appears to images in which no landmark appears exceeds a threshold value, the determination that the landmark may be a landmark related to a road section is admitted, and a rule in which when a ratio of images in which no landmark appears to images in which the landmark appears exceeds a threshold value, the determination that the landmark may be a landmark related to a road section is rejected.

Figure 12:
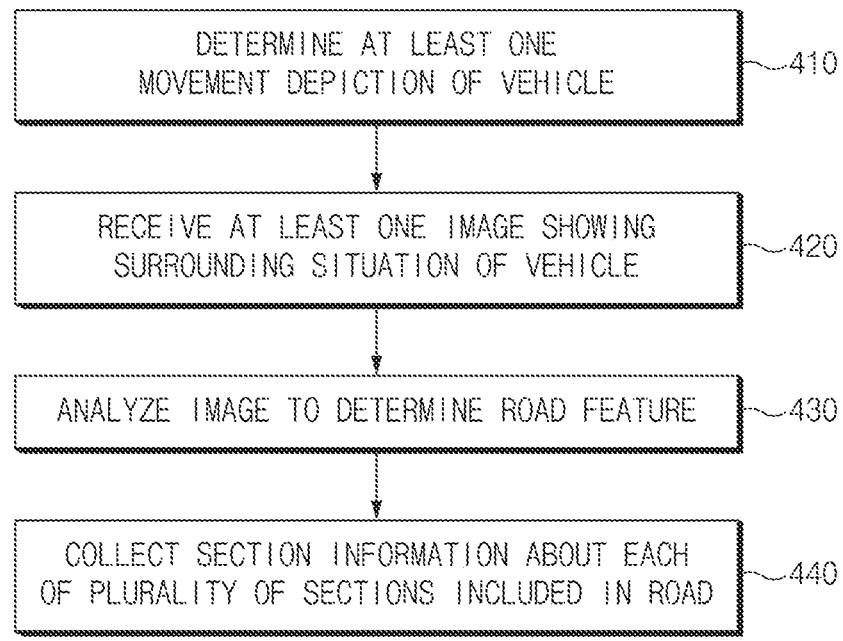
FIG. 12 is a flowchart showing a method for anonymizing navigation information by a vehicle control system according to one embodiment of the present disclosure.

FIG. 12 is a flowchart showing a method in which the vehicle control system according to one embodiment of the present disclosure anonymize navigation information.

The vehicle control system may determine at least one movement depiction of the vehicle in operation 410. The vehicle control system may determine at least one movement depiction based on an output value of the sensor. At least one movement description may include any indicator of the vehicle's movement. For example, at least one movement depiction may include a acceleration of the vehicle, a speed of the vehicle, longitudinal and transversal positions of the vehicle at a specific time, a three-dimensional position of the vehicle, and a determined trajectory of the vehicle.

At least one movement depiction may include the vehicle's itself-movement depiction in a predetermined coordinate system. The itself-movement may include rotation, translation, or movement in a transverse direction, longitudinal direction, or other directions of the vehicle. The vehicle's itself-movement may be expressed using a speed, a yaw rate, a tilt or a roll of the vehicle. A self-movement depiction of the vehicle may be determined on a given level of freedom.

The vehicle control system may receive at least one image showing the surrounding situation of the vehicle in operation 420. The vehicle control system may receive, from the camera, an image of the road on which the vehicle is driving and an image of a surrounding around the vehicle.

The vehicle control system may analyze the image to determine a road feature in operation 430. The vehicle control system may analyze at least one image according to a command stored in the image analysis module, or utilize a learning system such as a neural network to determine at least one road feature. At least one road feature may include a road feature such as a median line of the road, an edge of the road, a landmark along the road, a pothole on the road, a turn of the road, or the like. At least one road feature may include a lane feature including an indicator indicating at least one of lane separation, lane merging, dashed-line lane indication, solid-line lane indication, a road surface color in a lane, a line color, a lane direction, or a lane type regarding a lane as detected. The lane feature may include a determination that the lane is a HOV (High-Occupancy Vehicles) lane and a determination that the lane is separated from another lane by a solid line. At least one road feature may include an indicator of a road edge. The road edge may be determined based on a detected barrier along the road edge, a detected sidewalk, a line indicating an edge, a road boundary stone along the road edge, or based on detection of an object along the road.

The vehicle control system may collect section information about each of a plurality of sections included in the road in operation 440. The vehicle control system may divide the road into the plurality of sections. The vehicle control system may combine each of the plurality of sections with the road feature to collect the section information about each of the plurality of sections. The section information may include at least one movement depiction of the vehicle and/or at least one road feature relative to the section of the road. The vehicle control system may collect the section information including the movement depiction calculated in operation 410 and the road feature determined in operation 430.

Figure 13:
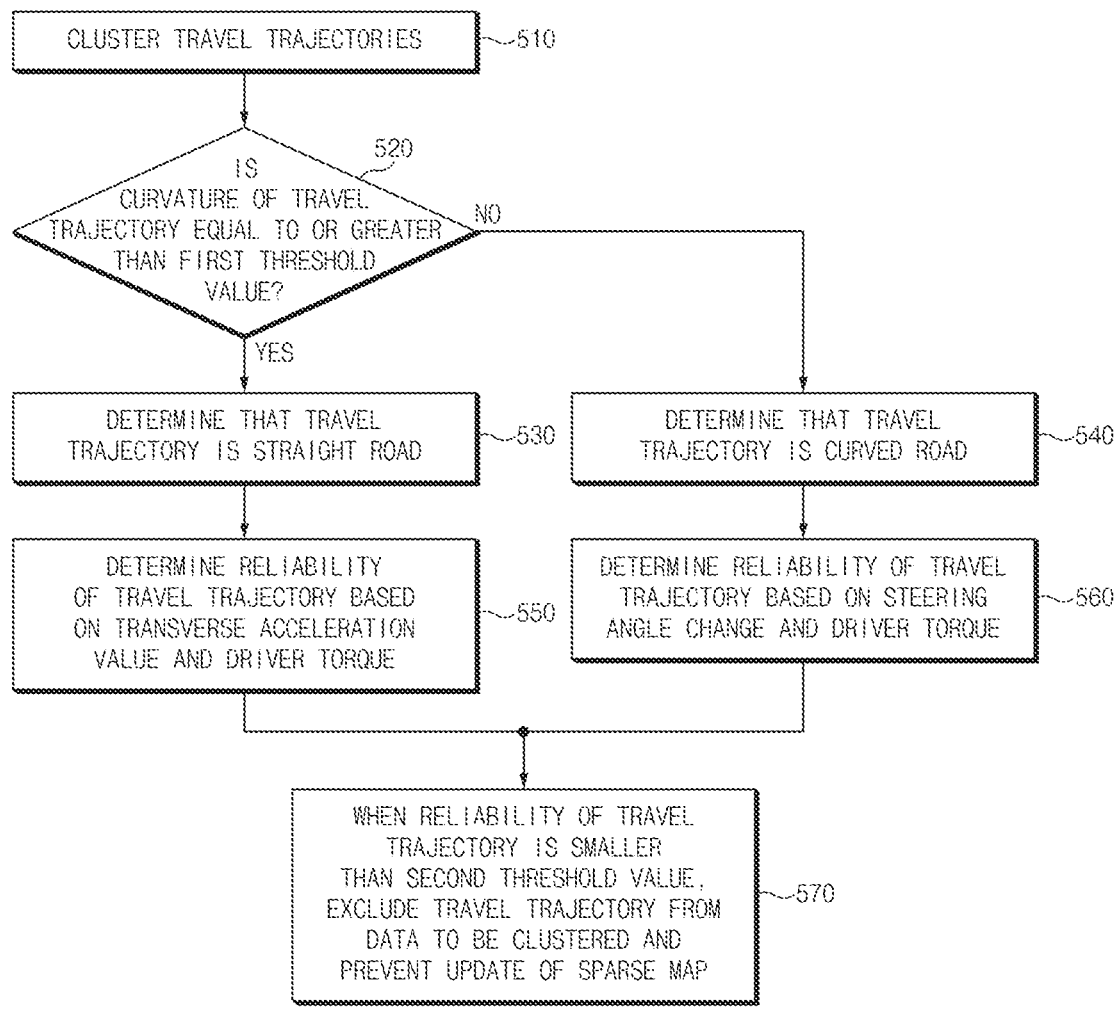
FIG. 13 is a flowchart showing a method in which when a vehicle control system according to one embodiment of the present disclosure clusters a travel trajectory, the vehicle control system selects data to be clustered, based on reliability of the travel trajectory.

FIG. 13 is a flowchart showing a method in which when a vehicle control system according to one embodiment of the present disclosure clusters a travel trajectory, the vehicle control system selects data to be clustered, based on reliability of the travel trajectory.

The vehicle control system may cluster the travel trajectories in operation 510. The vehicle control system may collect data about the travel trajectories that constitutes the sparse map. Data that should not be included in clustering, such as driving data with a large error, must be excluded to reduce an error of a finally calculated travel route obtained by calculating an average of a trajectory cluster.

The vehicle control system may determine whether a curvature of the travel trajectory is equal to or greater than a first threshold value in operation 520. The first threshold value may be a curvature value which is used to distinguish a straight road and a curved road from each other. The first threshold value may be 3000R. The vehicle control system may identify whether the travel trajectory is a straight road or a curved road, and may set criteria for determining reliability in the straight road and the curved road to be different from each other. The vehicle control system may proceed to operation 530 when the curvature of the travel trajectory is equal to or greater than the first threshold value (operation 520—YES). The vehicle control system may proceed to operation 540 when the curvature of the travel trajectory is smaller than the first threshold value (operation 520—NO).

The vehicle control system may determine that the travel trajectory is a straight road in operation 530. The vehicle control system may determine that the travel trajectory is a curved road in operation 540. The vehicle control system may determine whether the travel trajectory is a straight road or a curved road based on the curvature of the travel trajectory.

The vehicle control system may determine the reliability of the travel trajectory based on a transverse acceleration value and a driver torque in operation 550. The vehicle control system may determine whether the vehicle deviates from a vehicle's absolute travel direction and lane assignment using a diagnostic communication signal (CAN signal) output from the vehicle. The vehicle control system may determine whether the transverse acceleration value in a straight road is greater than or equal to a specific threshold value. The vehicle control system may determine that the vehicle is driving abnormally when the transverse acceleration value in a straight road is greater than or equal to the specific threshold value. The vehicle control system may determine that the reliability of the travel trajectory is smaller than a second threshold value when the transverse acceleration value in a straight road is greater than or equal to the specific threshold value. The vehicle control system may determine whether the driver torque is greater than or equal to a specific threshold value when the transverse acceleration value is smaller than the specific threshold value. The specific threshold value of the driver torque may be 5 Nm. When the driver torque is equal to or larger than the specific threshold value, the vehicle control system may determine that excessive steering wheel rotation has occurred due to the driver's intervention while the driver is holding the steering wheel. The vehicle control system may determine that the reliability of the travel trajectory is smaller than or equal to the second threshold value when the driver torque is greater than or equal to the specific threshold value.

The vehicle control system may determine the reliability of the travel trajectory based on steering angle change and the driver torque in operation 560. The vehicle control system may determine whether a change value of a steering angular velocity in a curved road is equal or larger than a specific threshold value. The vehicle control system may determine that the vehicle's behavior has changed suddenly and abnormally instantaneously when the change value of the steering angular velocity in a curved road is greater than or equal to the specific threshold value. The vehicle control system may determine that the reliability of the travel trajectory is smaller than or equal to the second threshold value when the change value of the steering angular velocity in a curved road is greater than or equal to the specific threshold value. The vehicle control system may determine whether the driver torque is greater than or equal to a specific threshold value when the change value of the steering angular velocity is smaller than a specific threshold value. The specific threshold value of the driver torque may be 5 Nm. When the driver torque is greater than or equal to the specific threshold value, the vehicle control system may determine that excessive steering wheel rotation has occurred due to the driver's intervention while the driver is holding the steering wheel. The vehicle control system may determine that the reliability of the travel trajectory is smaller than or equal to the second threshold value when the driver torque is greater than or equal to the specific threshold value.

When the reliability of the travel trajectory is smaller than the second threshold value, the vehicle control system may exclude the travel trajectory from the data to be clustered and may prevent update of the sparse map in operation 570. The vehicle control system may exclude data with an unusual driving pattern whose travel trajectory reliability is equal or smaller than the second threshold value from the clustering process.

Figure 14:
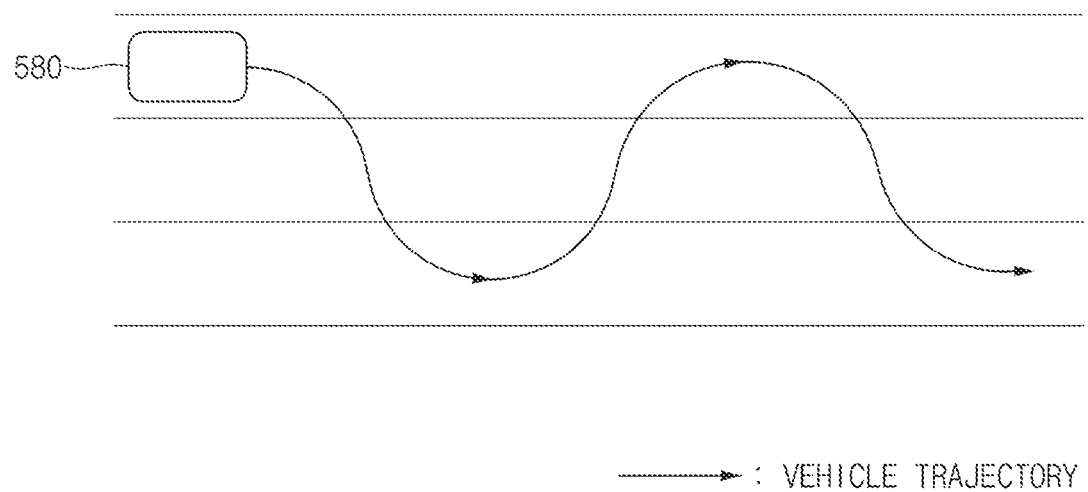
FIG. 14 is a diagram showing a travel trajectory excluded from clustering according to one embodiment of the present disclosure.

FIG. 14 is a diagram showing a travel trajectory excluded from clustering according to one embodiment of the present disclosure.

When a vehicle 580 drives along a straight road and then makes excessive lane change on a multi-line road, the transverse acceleration value may be greater than a specific threshold value. For example, the transverse acceleration value may be greater than the specific threshold value when the vehicle 580 makes an excessive number of cut-ins and/or unnecessary lane changes. In another example, when making an illegal left/right turn, a left turn from an unspecified lane such as a left turn from a second or third lane, and/or a right turn from an unspecified lane, the transverse acceleration value may be greater than the specific threshold value. In another example, when making an illegal U-turn from an unspecified lane, the transverse acceleration value may be greater than the specific threshold value. The vehicle control system may exclude, from clustering, a travel trajectory whose a transverse acceleration value is greater than the specific threshold value.

Figure 15:
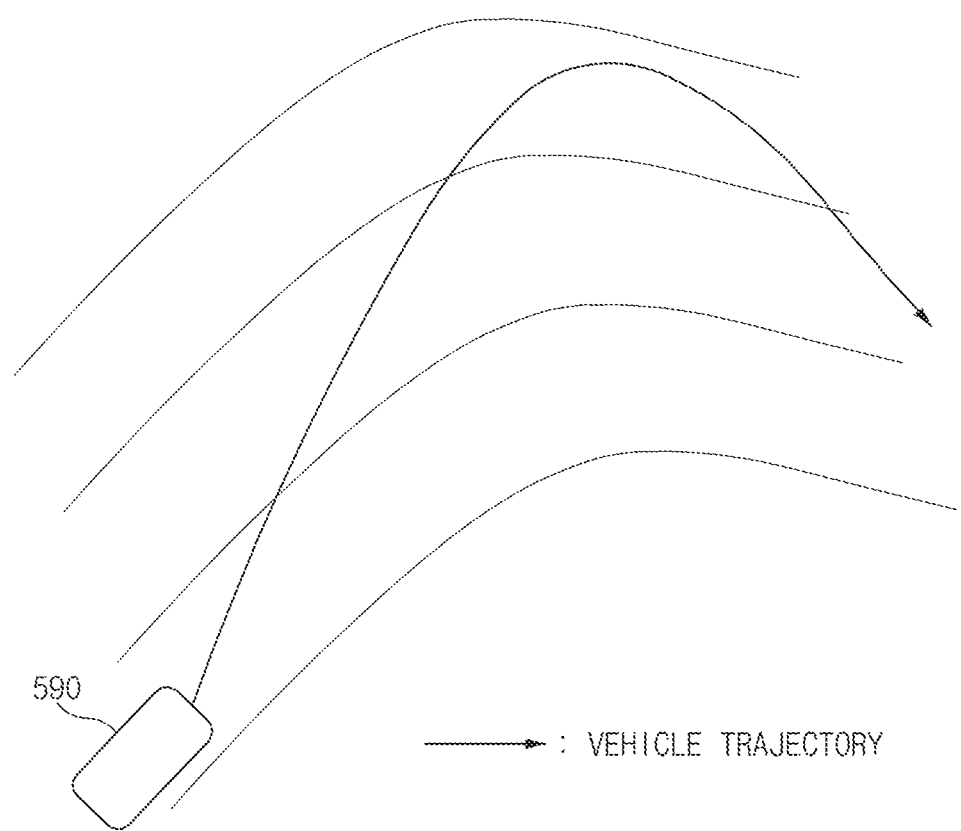
FIG. 15 is a diagram showing a travel trajectory excluded from clustering according to one embodiment of the present disclosure.

FIG. 15 is a diagram showing a travel trajectory excluded from clustering according to one embodiment of the present disclosure.

When a vehicle 590 drives in a risky cornering manner rather than in a general cornering manner while driving a curved road, the change value of the steering angular velocity may be greater than a specific threshold value. The vehicle control system may exclude, from clustering, a travel trajectory along which the change value of the steering angular velocity is greater than the specific threshold value.

Figure 16:
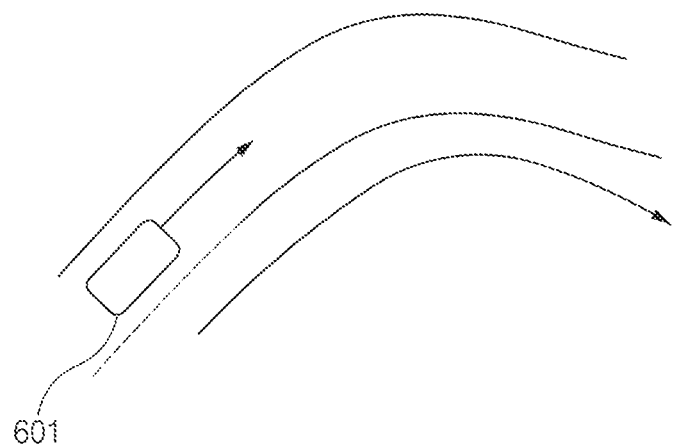
FIG. 16 is a diagram showing that a vehicle control system according to one embodiment of the present disclosure creates a virtual line in a section on a vehicle movement route where a line is discontinuous.

FIG. 16 is a diagram showing that the vehicle control system according to one embodiment of the present disclosure creates a virtual line in a section of a vehicle movement route where a line is discontinuous.

The vehicle control system may detect a line in a section in which a vehicle 601 is driving. The vehicle control system may detect a section of the vehicle's travel route where the line is discontinuous. The vehicle control system may generate a virtual line in the section where the line is discontinuous. The vehicle control system may assume that the virtual line is drawn on the road and may control the vehicle to drive autonomously along the virtual line.

Figure 17:
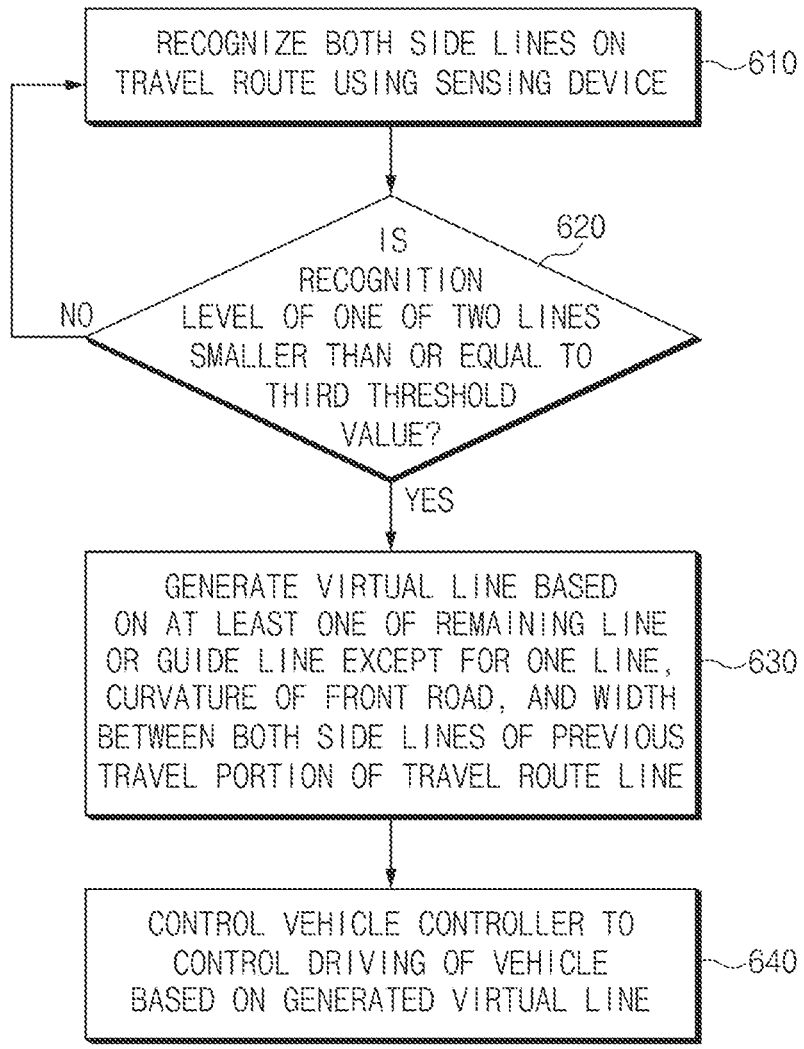
FIG. 17 is a flowchart showing a method in which a vehicle control system according to one embodiment of the present disclosure creates a virtual line to control driving of a vehicle.

FIG. 17 is a flowchart showing a method in which the vehicle control system according to one embodiment of the present disclosure creates a virtual line and controls the driving of the vehicle along the virtual line.

The vehicle control system may recognize both side lines on the travel route using the sensing device in operation 610. The vehicle control system may recognize a left line of the vehicle and a right line of the vehicle using a sensor that detects the line. A lane detection module constructing the sparse map may be used to compile various types of lines of the actual road into database.

The vehicle control system may identify whether a recognition level of one of the two lines on the travel route as recognized using the sensing device is smaller than or equal to a third threshold value in operation 620. The recognition level of the line may mean a level at which the line is visually recognized. The vehicle control system may determine that the recognition level of the line is smaller than or equal to the third threshold value when the line is blurred, cut off, erased, and/or a foreign material such as a tar mark is covered on the line. When the recognition level of at least one line is smaller than or equal to the third threshold value (operation 620—YES), the vehicle control system may proceed to operation 630. The vehicle control system may return to operation 610 when both side lines have a recognition level higher than the third threshold value (operation 620—NO).

The vehicle control system may generate the virtual line based on at least one of the remaining line or guide line except for one line, a curvature of a front road, and a width between both side lines of a previous travel portion of the travel route line in operation 630. When the other line except for one line whose the recognition level is equal to or smaller than the third threshold value is recognized, the vehicle control system may generate the virtual line from the line whose the recognition level is equal to or smaller than the third threshold value, based on the recognized remaining line, the curvature of the front road, and the width between both side lines in the previous travel portion. The vehicle control system may generate the virtual line by filling a line into a disconnected or unclear section of any one line. When the vehicle's travel route has a guidance line such as a highway ramp, a highway exit, or a tollgate area, the vehicle control system may generate the virtual line from one side line whose the recognition level is smaller than or equal to the third threshold value, based on the guide line, the curvature of the front road, and the width between both side lines in the previous travel section. The vehicle control system may generate a virtual line by filling a line into a disconnected or unclear section of any one line.

The vehicle control system may control a vehicle controller to control driving of the vehicle based on the generated virtual line in operation 640. The vehicle control system may proceed the autonomous driving while assuming that the created virtual line is drawn on the road.

The vehicle control system may update the sparse map based on the generated virtual line in operation 1550. The vehicle control system may control the vehicle controller based on the virtual line when the vehicle enters a driving section in which the virtual line has been updated. Thus, the vehicle control system may improve the accuracy and reliability of an autonomous driving navigation model in a section with a poorly drawn line.

Figure 18:
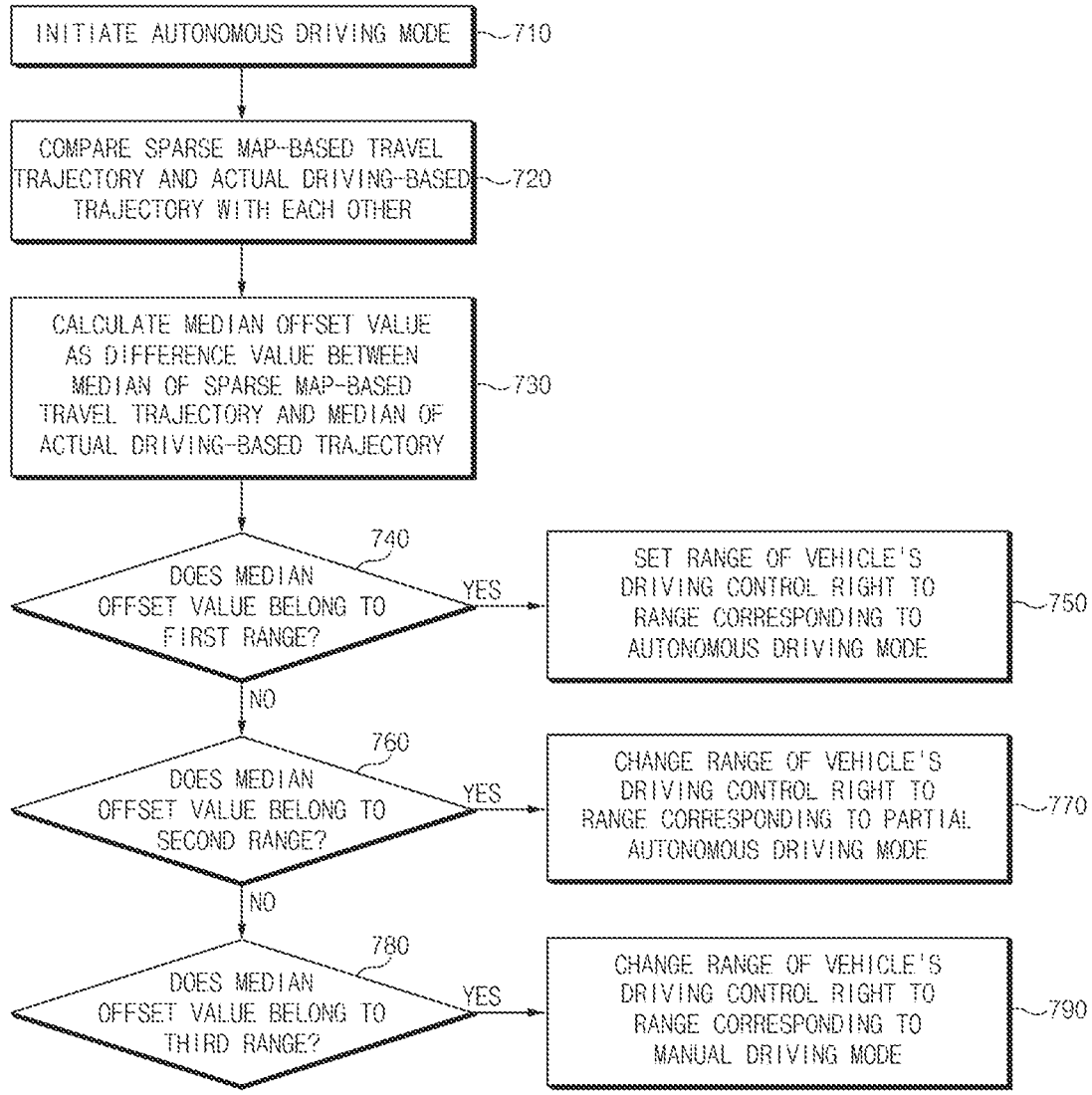
FIG. 18 is a flowchart showing a method in which a vehicle control system according to one embodiment of the present disclosure adjusts a range of a driving control right based on accuracy of a trajectory.

FIG. 18 is a flowchart showing a method in which the vehicle control system according to one embodiment of the present disclosure adjusts a range of a driving control right based on accuracy of a trajectory.

The vehicle control system may initiate an autonomous driving mode in operation 710.

The vehicle control system may compare a sparse map-based travel trajectory and an actual driving-based trajectory with each other in operation 720. The vehicle control system may compare a preset trajectory included in the sparse map with the trajectory along which the vehicle is actually driving, and may verify the vehicle's current driving route and determine the accuracy of the trajectory, based on the comparing result. The vehicle control system may determine a travel trajectory error that may occur when the vehicle drives along a road based on the trajectory included in the sparse map.

The vehicle control system may calculate a median offset value as a difference value between a median of the sparse map-based travel trajectory and a median of the actual driving-based trajectory in operation 730. When comparing the sparse map trajectory and the actual travel trajectory with each other based on the center of the vehicle, the median offset value may be a value indicating an error between the two trajectories.

The vehicle control system may identify whether the median offset value belongs to a first range in operation 740. The first range may be a length range of 0 or greater and 20 cm or smaller. The vehicle control system may identify whether the median offset value belongs to the first range for a specified time duration. The specified time duration may be 10 seconds. The vehicle control system may proceed to operation 750 when the median offset value belongs to the first range (operation 740—YES). The vehicle control system may proceed to operation 760 when the median offset value is out of the first range (operation 740—NO).

The vehicle control system may set a range of the vehicle's driving control right to a range corresponding to the autonomous driving mode in operation 750. The vehicle control system may determine that an error value between the sparse map-based travel trajectory and the actual travel trajectory is acceptable when the median offset value falls within the first range. The vehicle control system may determine that the safety and reliability of the driving may be secured even when the range of the vehicle's driving control right is set to the range corresponding to the autonomous driving mode because the current autonomous driving mode is reliable.

The vehicle control system may identify whether the median offset value belongs to a second range in operation 760. The second range may be a length range of 20 cm or greater and 30 cm or smaller. The vehicle control system may identify whether the median offset value belongs to the second range for the specified time duration. The vehicle control system may proceed to operation 770 when the median offset value belongs to the second range (operation 760—YES). The vehicle control system may proceed to operation 780 when the median offset value is out of the second range (operation 760—NO).

The vehicle control system may change the range of the vehicle's driving control right to a range corresponding to a partial autonomous driving mode in operation 770. The vehicle control system may determine that the error value between the sparse map-based travel trajectory and the actual travel trajectory has reached a value requiring correction when the median offset value falls within the second range. The vehicle control system may partially limit the range of the vehicle's driving control right. The vehicle control system may determine that it is necessary to modify the travel trajectory applied in the autonomous driving mode. The vehicle control system may modify the travel trajectory applied in the autonomous driving mode so as to be adapted to the actual road. The vehicle control system may guide the driver to modify the trajectory by warning the driver that the travel trajectory needs to be modified.

The vehicle control system may identify whether the median offset value belongs to a third range in operation 780. The third range may be a length range of 30 cm or greater. The vehicle control system may identify whether the median offset value belongs to the third range for the specified time duration. The vehicle control system may proceed to operation 790 when the median offset value belongs to the third range (operation 780—YES).

The vehicle control system may change the range of the vehicle's driving control right to a range corresponding to the manual driving mode in operation 790. When the median offset value belongs to the third range, the vehicle control system may determine that the error value between the sparse map-based travel trajectory and the actual travel trajectory has reached a value at which the autonomous driving mode should be terminated. The vehicle control system may limit an entire range of the vehicle's driving control right to end the autonomous driving mode and change a current mode to the manual driving mode. The vehicle control system may guide the driver to manual driving by warning the driver that the trajectory of the autonomous driving mode is not correct and thus the autonomous driving mode changes to the manual driving mode.

The vehicle control system according to the present disclosure may improve accuracy of a travel route on which the vehicle is to drive.

In addition, various effects directly or indirectly identified via the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle control system comprising:
   a processor configured to process data related to driving of a vehicle; and
   a vehicle controller configured to control the driving of the vehicle,
   wherein the processor is configured to perform:
   operation of clustering a plurality of trajectories, excluding at least one trajectory from the clustered plurality of trajectories based on a reliability of the at least one trajectory which is determined based on different parameters set for a straight road and a curved road;
   operation of updating a sparse map, the different parameters including a transverse acceleration value of the vehicle for the straight road and a steering angle change of the vehicle for the curved road; and
   operation of adjusting a range of a driving control right of the vehicle, based on a travel trajectory in the updated sparse map.

2. The system of claim 1, wherein the system further comprises: an input device for receiving a user input for controlling a driving function of the vehicle;
   a sensing device for acquiring data related to the driving of the vehicle from the vehicle and an external environment;
   an imaging device for sensing and imaging the external environment; and
   an output device for providing information related to the driving of the vehicle.

3. The system of claim 1, wherein the processor is configured to:
   determine whether a curvature of the travel trajectory is greater than or equal to a first threshold value;
   determine whether the travel trajectory is a straight road or a curved road based on the curvature of the travel trajectory;
   determine reliability of the travel trajectory; and
   in response to determination that the reliability of the travel trajectory is equal to or lower than a second threshold value, exclude the travel trajectory from the data to be clustered and exclude the travel trajectory in updating the sparse map.

4. The system of claim 3, wherein the processor is configured to:
   in response to determination that the curvature of the travel trajectory is greater than or equal to the first threshold value, determine that the travel trajectory is the straight road; and
   in response to determination that the curvature of the travel trajectory is less than the first threshold value, determine that the travel trajectory is the curved road.

5. The system of claim 3, wherein the processor is configured to:
   in response to determination that the travel trajectory is the straight road, determine the reliability of the travel trajectory based on the transverse acceleration value of the vehicle and a driver torque; and
   in response to determination that the travel trajectory is the curved road, determine the reliability of the travel trajectory based on the change amount in a steering angular velocity, and the driver torque.

6. The system of claim 5, wherein the processor is configured to:
   in response to determination that the transverse acceleration value is greater than or equal to a specific threshold value and/or when the driver torque is greater than or equal to a specific threshold value, determine that the reliability of the travel trajectory is less than or equal to the second threshold value; and in response to determination that the change amount in the steering angular velocity is greater than or equal to a specific threshold value, determine that the reliability of the travel trajectory is less than or equal to the second threshold value.

7. The system of claim 3, wherein the processor is configured to determine whether the vehicle deviates from an absolute travel direction of the vehicle and an allocated lane, based on a diagnostic communication signal (CAN signal) output from the vehicle.

8. The system of claim 1, wherein the processor is configured to:
compare the travel trajectory based on the sparse map and an actual driving-based trajectory with each other;
calculate a median offset value as a difference value between a median of the travel trajectory based on the sparse map and a median of the actual driving-based trajectory; and
adjust the range of the driving control right of the vehicle based on the median offset value.

9. The system of claim 8, wherein the processor is configured to:
when the median offset value belongs to a first range for a specified time duration, set the range of the driving control right to a range corresponding to an autonomous driving mode;
when the median offset value belongs to a second range for a specified time duration, change the range of the driving control right to a range corresponding to a partially autonomous driving mode; and
when the median offset value belongs to a third range, change the range of the driving control right to a range corresponding to a manual driving mode,
wherein the first range is a length range from 0 to 20 cm,
wherein the second range is a length range from 20 cm to 30 cm,
wherein the third range is a length range of 30 cm or larger.

10. The system of claim 9, wherein the processor is configured to correct the travel trajectory so as to match an actual road.

11. A vehicle control system comprising:
a processor configured to process data related to driving of a vehicle; and
a sensing device configured to acquire data related to the driving of the vehicle from the vehicle and an external environment; and
a vehicle controller configured to control the driving of the vehicle,
wherein the processor is configured to:
determine whether a recognition level of one of both side lines on a travel route recognized using the sensing device is less than or equal to a third threshold value;
in response to a determination that the recognition level of one of both side lines on a travel route recognized using the sensing device is less than or equal to the third threshold value, generate a virtual line based on at least one of the other of the both side lines, a guide line, a curvature of a front road, or a width between both side lines of a previous travel section of the travel route; and
control the vehicle controller to control the driving of the vehicle, based on the generated virtual line.

12. The system of claim 11, wherein the processor is configured to update the generated virtual line in a sparse map.

13. The system of claim 11, wherein when the one of both side lines is blurred, broken, erased, and/or covered with a foreign substance including a tar mark, the processor is configured to determine that the recognition level of the one of the both side lines is less than or equal to the third threshold value.

14. The system of claim 11, wherein when the other of the both side lines other than the one of the both side line having the recognition level is than or equal to a third threshold value is recognized, the processor is configured to generate the virtual line by filling a discontinuous or unclear section of the one of the both side lines, based the other line, the curvature of the front road, and the width between the both side lines of the previous section.

15. The system of claim 11, wherein when the travel route is a highway entrance, highway exit, or a route with the guide line including a toll gate area, the processor is configured to generate the virtual line by filling a discontinuous or unclear section of the one of the both side lines, based the guide line, the curvature of the front road, and the width between the both side lines of the previous section.

16. A method for driving a vehicle using a vehicle control system, comprising:
clustering a plurality of trajectories;
excluding at least one trajectory from the clustered plurality of trajectories based on a reliability of the at least one trajectory which is determined based on different parameters set for a straight road and a curved road;
updating a sparse map, the different parameters including a transverse acceleration value of the vehicle for the straight road and a steering angle change of the vehicle for the curved road; and
adjusting a range of a driving control right of the vehicle, based on a travel trajectory in the updated sparse map.

17. The method of claim 16, wherein the excluding at least one trajectory from the clustered plurality of trajectories based on a reliability of the at least one trajectory which is determined based on different parameters set for a straight road and a curved road includes:
determining whether a curvature of the travel trajectory is greater than or equal to a first threshold value;
determining whether the travel trajectory is the straight road or the curved road based on the curvature of the travel trajectory;
determining reliability of the travel trajectory; and
when the reliability of the travel trajectory is less than or equal to the second threshold value, excluding the travel trajectory from the data to be clustered and excluding the travel trajectory in updating the sparse map.

18. The method of claim 17, wherein the determining of whether the travel trajectory is the straight road or the curved road includes:
when the curvature of the travel trajectory is greater than or equal to the first threshold value, determining that the travel trajectory is the straight road; and
when the curvature of the travel trajectory is less than the first threshold value, determining that the travel trajectory is the curved road.

19. The method of claim 16, wherein the method includes:
comparing the travel trajectory based on the sparse map and an actual driving-based trajectory with each other;
calculating a median offset value as a difference value between a median of the travel trajectory based on the sparse map and a median of the actual driving-based trajectory; and adjusting the range of the driving control right of the vehicle based on the median offset value.

20. The method of claim 19, wherein the adjusting of the range of the driving control right of the vehicle includes:
when the median offset value belongs to a first range for a specified time duration, setting the range of the driving control right to a range corresponding to an autonomous driving mode;
when the median offset value belongs to a second range for a specified time duration, changing the range of the driving control right to a range corresponding to a partially autonomous driving mode; and
when the median offset value belongs to a third range, changing the range of the driving control right to a range corresponding to a manual driving mode,
wherein the first range is a length range from 0 to 20 cm,
wherein the second range is a length range from 20 cm to 30 cm,
wherein the third range is a length range of 30 cm or larger.

* * * * *